(12) United States Patent
Binder et al.

(10) Patent No.: US 12,264,740 B2
(45) Date of Patent: Apr. 1, 2025

(54) CLAW-TYPE GEARSHIFT AND METHOD OF SHIFTING A CLAW-TYPE GEARSHIFT

(71) Applicant: Hoerbiger Antriebstechnik Holding GmbH, Schongau (DE)

(72) Inventors: Juergen Binder, Schongau (DE); Werner Fuerguth, Schongau (DE); Andreas Dempfle, Schongau (DE); Wolfgang Voelk, Schongau (DE); Thomas Schnelzer, Schongau (DE); Peter Echtler, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 253 days.

(21) Appl. No.: 18/050,201

(22) Filed: Oct. 27, 2022

(65) Prior Publication Data

US 2023/0140319 A1 May 4, 2023

(30) Foreign Application Priority Data

Oct. 28, 2021 (DE) .......................... 102021128171.7

(51) Int. Cl.
*F16H 63/30* (2006.01)
*F16H 61/04* (2006.01)
*F16H 63/04* (2006.01)

(52) U.S. Cl.
CPC .......... *F16H 63/30* (2013.01); *F16H 61/0403* (2013.01); *F16H 63/04* (2013.01); *F16H 2063/3093* (2013.01)

(58) Field of Classification Search
CPC ...... F16H 63/30; F16H 61/0403; F16H 63/04; F16H 2063/3093; F16H 2061/0474; F16D 2023/0631; F16D 23/06; F16D 11/00; F16D 21/04; F16D 2011/006; F16D 2023/0625; F16D 2023/065; F16D 2023/0618; F16D 2023/0656

See application file for complete search history.

(56) References Cited

U.S. PATENT DOCUMENTS

| | | | |
|---|---|---|---|
| 5,135,087 A * | 8/1992 | Frost | F16D 23/06 192/53.31 |
| 8,469,168 B2 * | 6/2013 | Park | F16D 23/06 192/53.361 |
| 10,578,169 B2 * | 3/2020 | Pritchard | F16D 23/06 |

* cited by examiner

*Primary Examiner* — Victor L MacArthur
(74) *Attorney, Agent, or Firm* — McNees Wallace & Nurick LLC

(57) ABSTRACT

A claw-type gearshift has a sliding sleeve which is adapted to be axially displaced on a hub body and a clutch body of a speed change gear. The hub body has at least one thrust piece arranged thereon which includes a friction surface that cooperates with a mating friction surface on the clutch body, the at least one thrust piece being displaceable in the circumferential direction between a release position and two locking positions that are located on either side of the release position. A first locking structure on the at least one thrust piece cooperates with a second locking structure on the internal toothing of the sliding sleeve. The locking structures are configured such that in each of the locking positions, the locking structures rest against each other such that a further axial movement of the sliding sleeve is blocked. For shifting a gear, a difference in speed between the clutch body and the hub body is reduced.

11 Claims, 6 Drawing Sheets

CLAW-TYPE GEARSHIFT AND METHOD OF SHIFTING A CLAW-TYPE GEARSHIFT

TECHNICAL FIELD

The disclosure relates to a claw-type gearshift and a method of shifting a claw-type gearshift. The claw-type gearshift is provided in particular for a manual transmission of a vehicle.

BACKGROUND

Claw-type gearshifts, i.e. shiftable claw clutches, have the drawback in motor vehicles that vibrations and noise may occur during engagement of the two coupling elements with each other when there are rotational speed differences.

The object of the disclosure is to provide a claw-type gearshift in which noise generation and wear are reduced.

SUMMARY

The claw-type gearshift according to the disclosure includes a sliding sleeve which is adapted to be axially displaced on a hub body and has an internal toothing having a multitude of sliding sleeve teeth, and a clutch body of a speed change gear, which has an external toothing which has a multitude of clutch body teeth and is adapted to engage in the internal toothing of the sliding sleeve. Arranged on the hub body is at least one thrust piece which is coupled to the sliding sleeve and includes a friction surface that cooperates with a mating friction surface on the clutch body. The thrust piece is displaceable in relation to the hub body in the circumferential direction by a certain degree between a release position and two locking positions, the locking positions being located on either side of the release position in the circumferential direction. The thrust piece includes a first locking structure which cooperates with a second locking structure on the internal toothing of the sliding sleeve, the locking structures being configured such that in each of the locking positions, the locking structures rest against each other such that a further axial movement of the sliding sleeve is blocked.

Similar to a synchronizer ring of a known synchronized gearshift, the thrust pieces in this entirely different application prevent the sliding sleeve from striking the clutch body at a high differential speed. The thrust pieces allow the sliding sleeve toothing to engage with the clutch body toothing only after an adaption of the speeds, which, however, is preferably not performed by the thrust pieces themselves, but away from the claw-type gearshift. In this way, noise generation and component wear are significantly reduced.

The thrust pieces here take over the function of a synchronizer ring in known synchronized gearshifts. The claw-type gearshift therefore advantageously comprises neither a synchronizer ring nor a blocking ring.

The thrust pieces preferably each include a spring-loaded ball which is radially displaceable in a known manner and which provides for the initial axial deflection of the thrust piece by the sliding sleeve and which is pressed radially into the thrust piece by the sliding sleeve when the sliding sleeve is displaced toward the speed change gear so far that the internal toothing of the sliding sleeve engages with the external toothing of the clutch body. These balls, however, are preferably not involved in locking the sliding sleeve.

Generally, there is no provision for the sliding sleeve to actively return the thrust pieces to their release position in order to allow an engagement. The thrust pieces preferably constitute a form-locking blockade for the sliding sleeve against displacement of the sliding sleeve teeth between the clutch body teeth when an axial shifting force is applied in the non-synchronized state. To this end, in particular, the locking structures are configured such that the sliding sleeve cannot return the thrust pieces to the release position when a shifting force is applied axially.

For example, the first locking structure on the thrust piece includes two axially limited and oppositely oriented recesses that are open in the circumferential direction, and the second locking structure on the internal toothing of the sliding sleeve is formed by radial tooth extensions, wherein in each of the locking positions a respective tooth extension engages in one of the recesses. The axial delimitation of the recesses prevents an axial movement of the tooth extension and thus of the entire sliding sleeve.

The tooth extensions are provided, for example, to limit a shifting travel toward the clutch body, that is, they fulfill a dual function in that they also act as a locking structure.

In order to be able to move between the locking positions and the release position, the thrust pieces are received in the hub body so as to be movable to a certain degree in the circumferential direction. For example, the thrust pieces are each received in a retainer in the hub body, the retainer being designed to be so large that it allows a displacement of the thrust piece in the circumferential direction into both locking positions.

The range of movement of the thrust pieces in the circumferential direction preferably comprises half an angular distance between neighboring sliding sleeve teeth, so that the tooth extension can both engage in and slide completely out of the recess.

In addition, the thrust pieces are movable in the axial direction to such an extent that the thrust pieces can be brought into contact with the clutch body by the sliding sleeve.

Restoring the thrust pieces is preferably effected by a rotational speed crossing, i.e. a change in direction of the relative rotational speed of the clutch body and the hub body after a zero crossing.

There are two possible scenarios for this. For one thing, the relative rotational speed experiences a change in direction when one component, that is, the clutch body or the hub body, which was previously leading the other, now lags behind it, but both components retain their previous absolute direction of rotation. For another thing, the relative rotational speed also changes direction when one of the components, that is, the clutch body or the hub body, changes its absolute direction of rotation.

In either case, the frictional torque also undergoes a change of direction.

The friction surface preferably forms a portion of a conical surface, while the mating friction surface is circumferentially conical all around to provide a sufficiently high frictional force.

Preferably, the friction surface is formed on a lower surface of the thrust piece.

Since in a claw clutch the sliding sleeve teeth and the clutch body teeth are normally formed without engagement slopes, the required axial installation space for the claw-type gearshift is reduced.

Generally, the friction surface and/or the mating friction surface may be formed only by the surface of the material of the thrust piece or of the clutch body, with a suitable structuring, if required, for example a grooved structure. In addition, one or both friction surfaces may also be provided with a friction-enhancing and/or wear-reducing coating.

The above-mentioned object is also achieved by a method of shifting a claw-type gearshift, in particular a claw-type gearshift as described above. The claw-type gearshift includes a sliding sleeve which is adapted to be axially displaced on a hub body and a clutch body of a speed change gear, which is adapted to move into engagement with the sliding sleeve, wherein arranged on the hub body is at least one thrust piece which is adapted to be deflected axially and in the circumferential direction and which includes a friction surface adapted to come into contact with a mating friction surface on the clutch body. A difference in speed of the clutch body and the hub body is reduced. When the thrust piece is deflected axially, the friction surface of the thrust piece comes into contact with the mating friction surface of the clutch body. The thrust piece is displaced to one of the locking positions in the circumferential direction by the frictional connection with the clutch body, wherein a further axial movement of the sliding sleeve is prevented by the engagement of the first locking structure on the thrust piece with the second locking structure on the sliding sleeve. Subsequently, the thrust piece is returned to the release position in the circumferential direction by the frictional connection when a change in direction of the relative rotational speeds of the clutch body and the hub body occurs, and the internal toothing of the sliding sleeve is engaged with the external toothing of the clutch body.

Restoring the thrust piece to the release position is effected exclusively by the thrust piece(s) being entrained by the clutch body or the hub body when one of these components experiences a rotational speed crossing.

As long as the hub body and the clutch body rotate in the same direction at different speeds, the thrust pieces preferably block an axial further movement of the sliding sleeve irrespective of the shifting force acting.

If a tooth-on-tooth position occurs at the first contact between the sliding sleeve teeth and the clutch body teeth, a relative rotation between the hub body and the clutch body, which allows the internal toothing of the sliding sleeve to engage with the external toothing of the clutch body, is advantageously achieved by a speed difference between the hub body and the clutch body that builds up after rotational speed crossing. Typically, a small speed difference necessarily appears after only a short time following rotational speed crossing. Therefore, the clutch body and the sliding sleeve will automatically move to a tooth-on-gap position.

At this point in time, the thrust piece is already in its release position and no longer blocks the sliding sleeve. It is also of advantage that the speed adaption need not be designed such that it results in completely identical speeds of the hub body and the clutch body.

In particular, the adaption of the speeds of the hub body and the clutch body is not performed by the thrust piece(s), but through a device that is separate from the thrust piece and can be implemented at a suitable location in the vehicle away from the claw-type gearshift.

The speed adaption is preferably initiated before the shifting force is applied and the sliding sleeve is moved, so that the thrust piece does not come into contact with the clutch body until the speeds have already been largely matched. The frictional connection between the thrust piece and the clutch body therefore only has to withstand very small speed differences, so that the design of the thrust piece and its retainer in the hub body can be essentially adopted from known thrust pieces.

DETAILED DESCRIPTION

Figure 1:
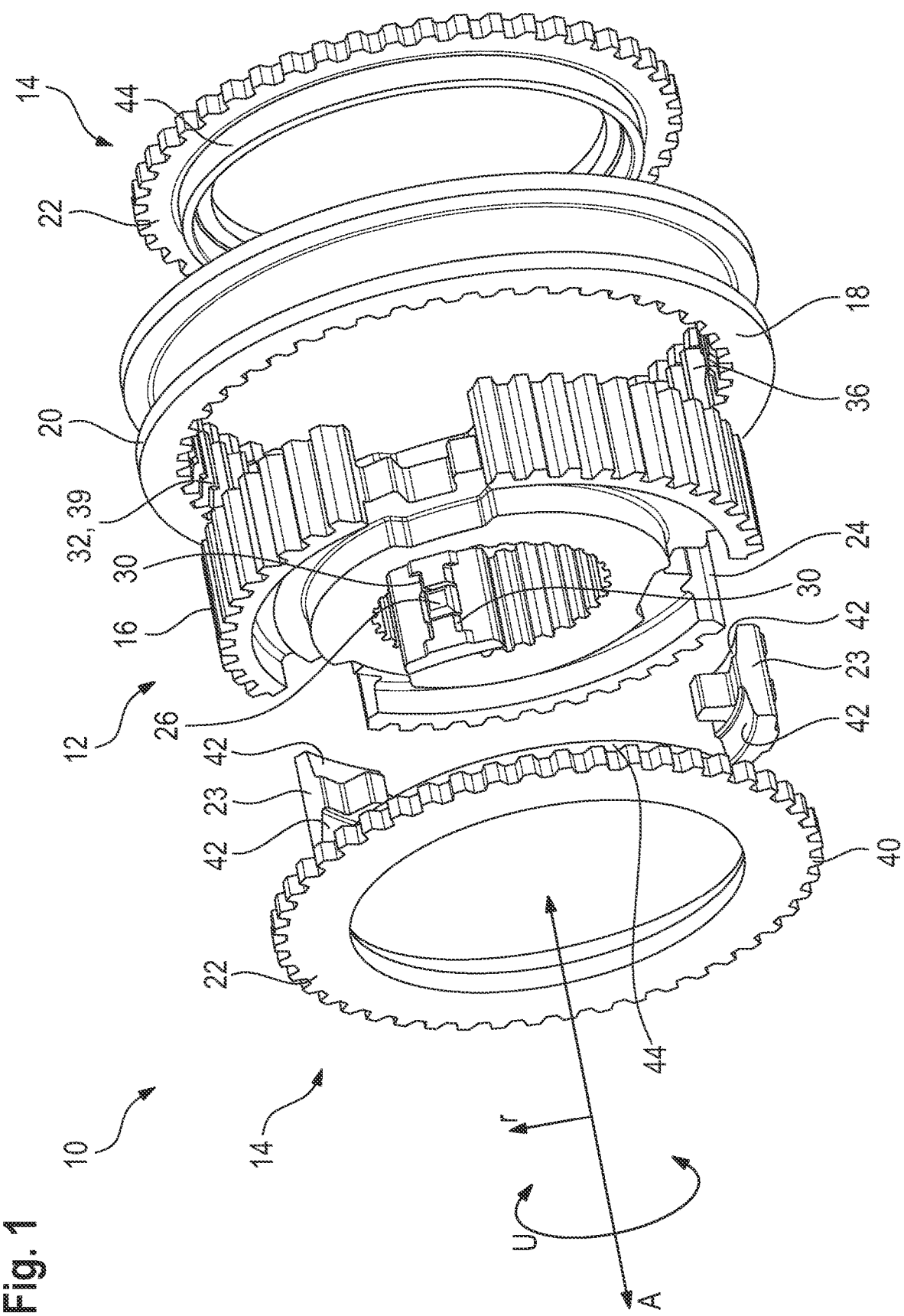
FIG. 1 shows a schematic exploded view of a claw-type gearshift according to the disclosure for carrying out a method according to the disclosure.

For the sake of clarity, where components are shown more than once in the drawings, not all of them are provided with reference numbers.

The claw-type gearshift 10 illustrated in the figures, which is designed here for a manual transmission of a motor vehicle, serves to optionally connect a rotatable shaft to a speed change gear (not shown) for joint rotation therewith. The shaft carries a hub body 12, which is connected to said shaft for joint rotation therewith, while a clutch body 14 is permanently attached to the speed change gear for joint rotation therewith.

The hub body 12 includes an external toothing 16 that is permanently in engagement with an internal toothing 18 of a sliding sleeve 20 that surrounds the hub body 12 in the circumferential direction U.

The sliding sleeve 20 is displaceable in the axial direction A by a certain degree to either side of the hub body 12, with the toothings 16, 18 remaining in engagement with each other at all times. The sliding sleeve 20 is axially displaceable so far that the internal toothing 18 comes to engage with an external toothing 22 of the clutch body 14.

As is illustrated in FIG. 1, generally two speed change gears, each with a clutch body 14, are arranged on either side of the hub body 12 so that two gears can be shifted by the axial movement of the sliding sleeve 20.

In a circumferential surface of the hub body 12, a plurality of thrust pieces 23, in this case three, are arranged so as to be evenly distributed over the circumference, which are each accommodated in a radial retainer 24 and which are movable to a certain degree in both directions both in the axial direction A and in the circumferential direction U.

Figure 7:
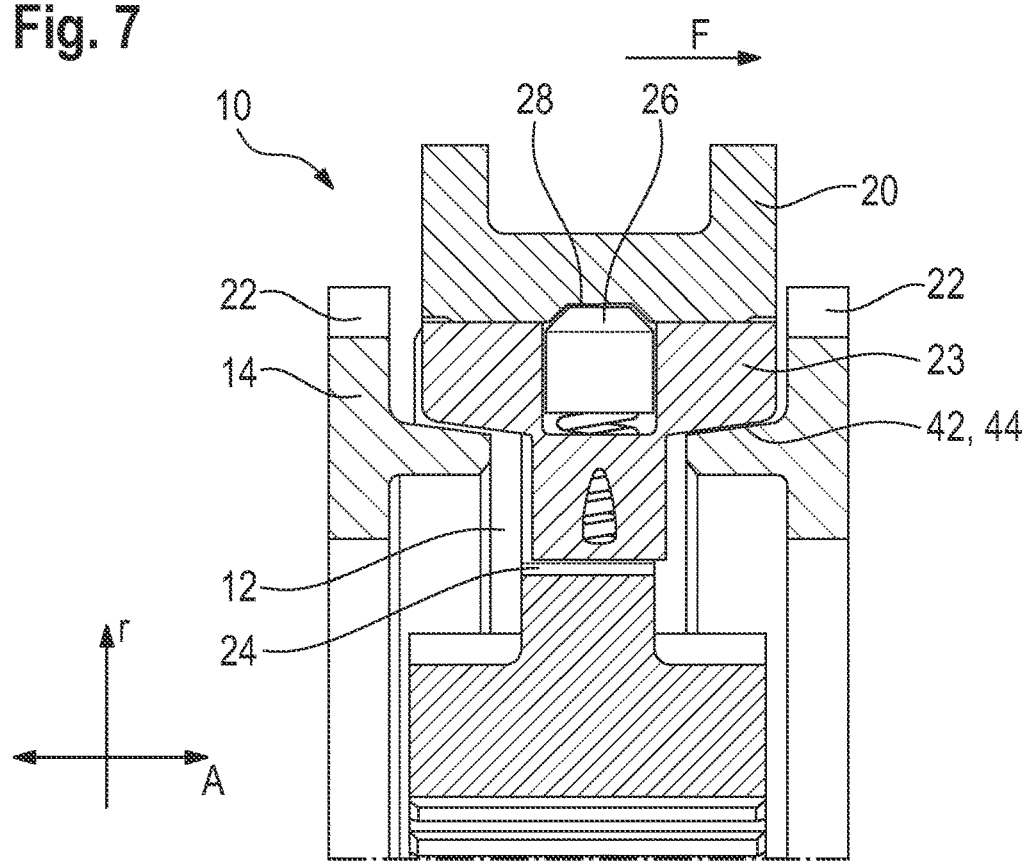
FIGS. 7 and 8 show schematic views of the claw-type gearshift from FIG. 1 in a locked position, with the thrust piece in one of its locking positions.
Figure 8:
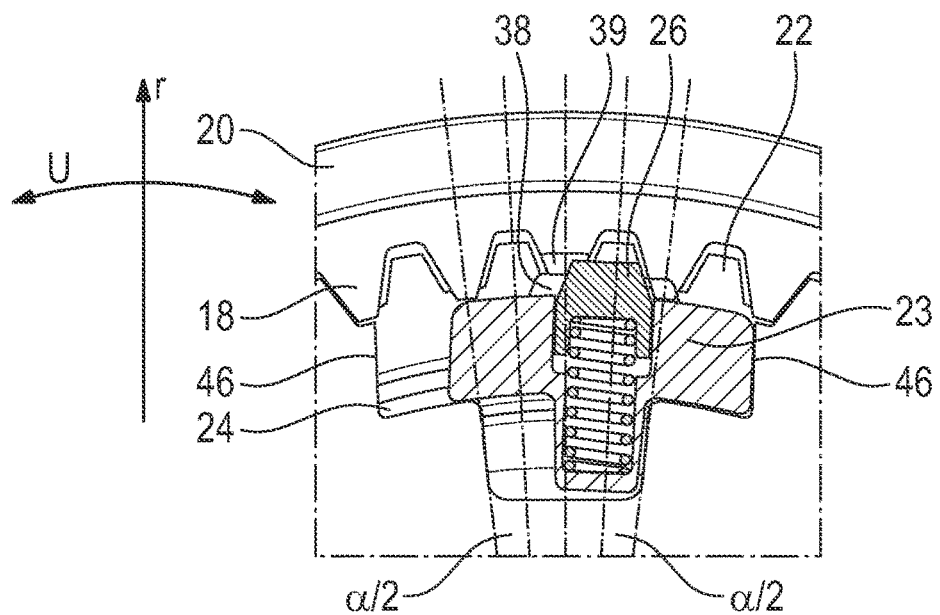

Accommodated in each of the thrust pieces 23 is a so-called locking block 26, which can be pressed into the thrust piece 23 in the radial direction r against a spring tension. With respect to the movement in the axial direction A, the thrust pieces 23 cooperate with the sliding sleeve 20 in a known manner. In a neutral position, the locking blocks 26 each engage in a latching groove 28 on the inside of the sliding sleeve 20, so that the thrust pieces 23 are deflected axially when the sliding sleeve 20 is displaced (see FIGS. 7 and 8). When the internal toothing 18 of the sliding sleeve 20 engages the external toothing 22 of the clutch body 14, the locking blocks 26 are pressed into the respective thrust piece 23 so that the sliding sleeve 20 can slide thereover (see FIGS. 9 and 10).

In this example, all three thrust pieces 23 are of identical structure.

On the surface that fits into the external toothing 16 of the hub body 12, each of the thrust pieces 23 has a first locking structure 30 that cooperates with a second locking structure 32 on the internal toothing 18 of the sliding sleeve 20 to block an axial movement of the sliding sleeve 20 in the locked position of the claw clutch 10.

The first locking structure 30 is formed here by two opposing recesses 34 which are open in the circumferential direction U and are each bounded axially by a web 38. The sides of the webs 38 that face the recess 34 extend in the circumferential direction U.

Figure 4:
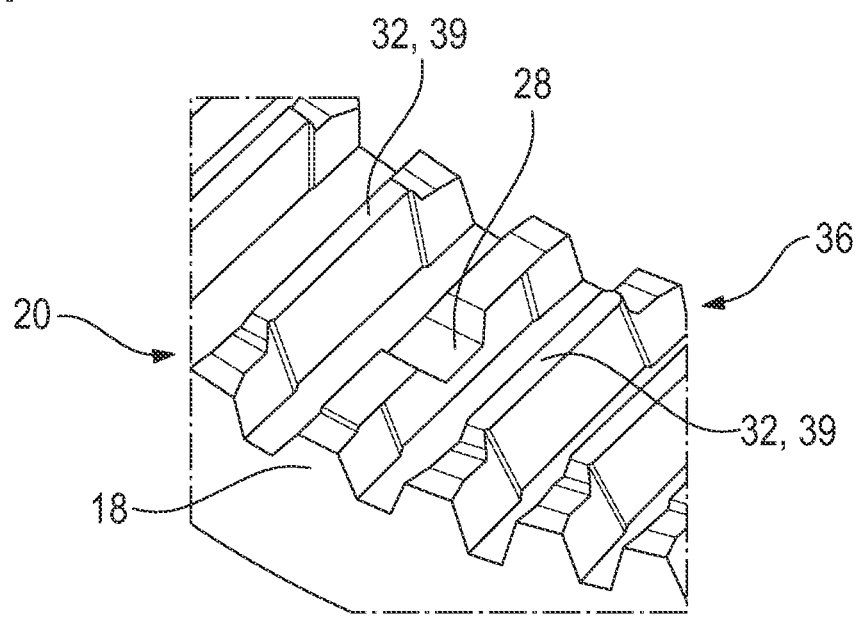

The second locking structure 32 here consists of a respective tooth extension 39 on each of the sliding sleeve teeth 36 that are adjacent to the tooth having the latching groove 28 (see FIG. 4). Each tooth extension 39 projects radially beyond the rest of the sliding sleeve tooth 36. The axial length of the recesses 34 is coordinated with the axial length of the tooth extensions 39 such that the latter can fully lie in the recess 34 in the axial direction A.

In the circumferential direction U, the recesses 34 are each spaced apart from the next sliding sleeve tooth 36 by half a tooth spacing of the sliding sleeve toothing 18 in the neutral position of the claw clutch 10.

The tooth extensions 39 perform a dual function here, in that they also serve as a stop in a known manner to specify the depth of engagement between the sliding sleeve toothing 18 and the clutch body toothing 22 and thus to limit the shifting travel of the sliding sleeve 20.

At its axial edges, each thrust piece 23 includes a friction surface 42, which here is arranged on the lower side of the thrust piece 23.

Figure 2:
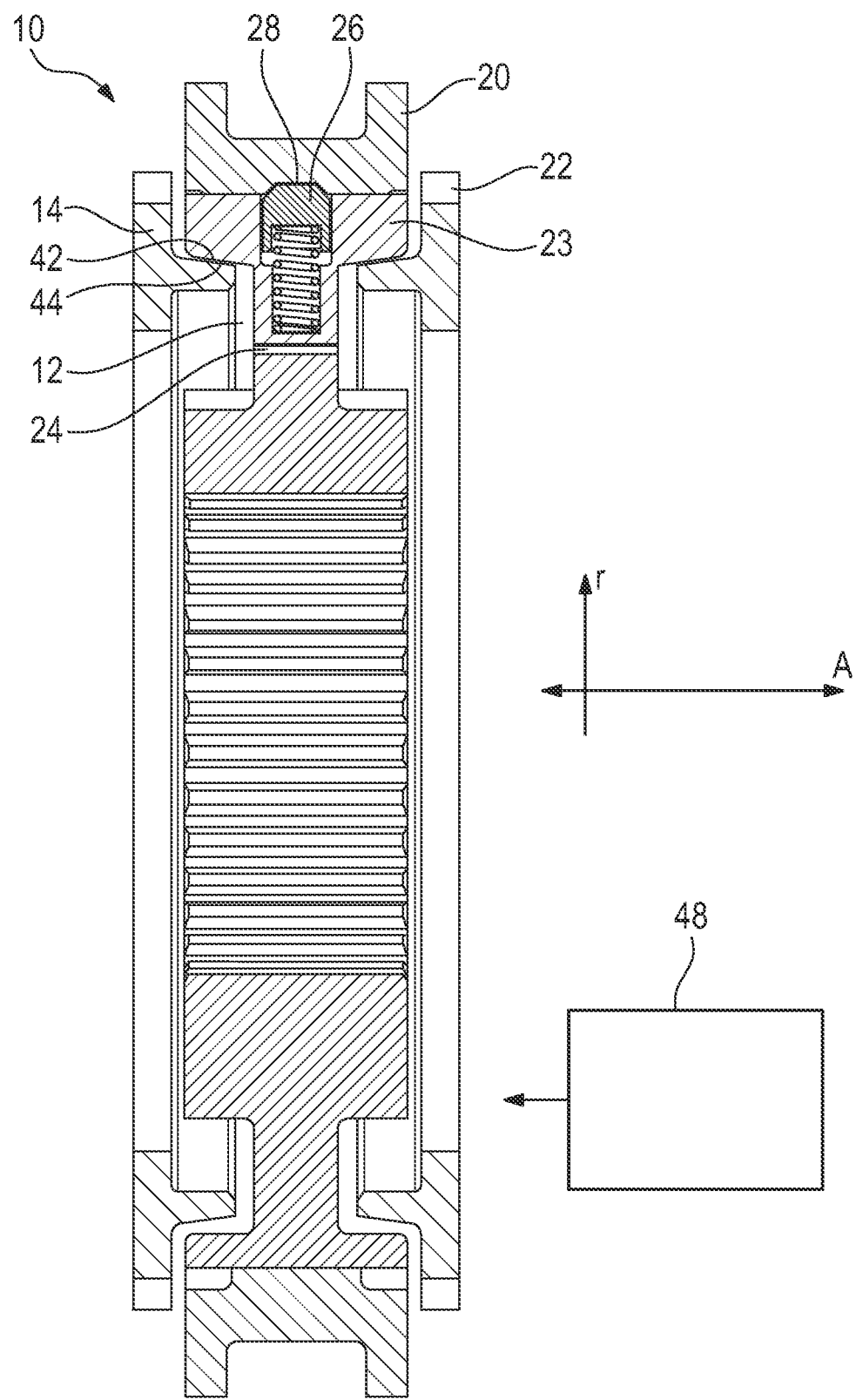
FIG. 2 shows a schematic partly sectional view of the claw-type gearshift of FIG. 1.
Figure 3:
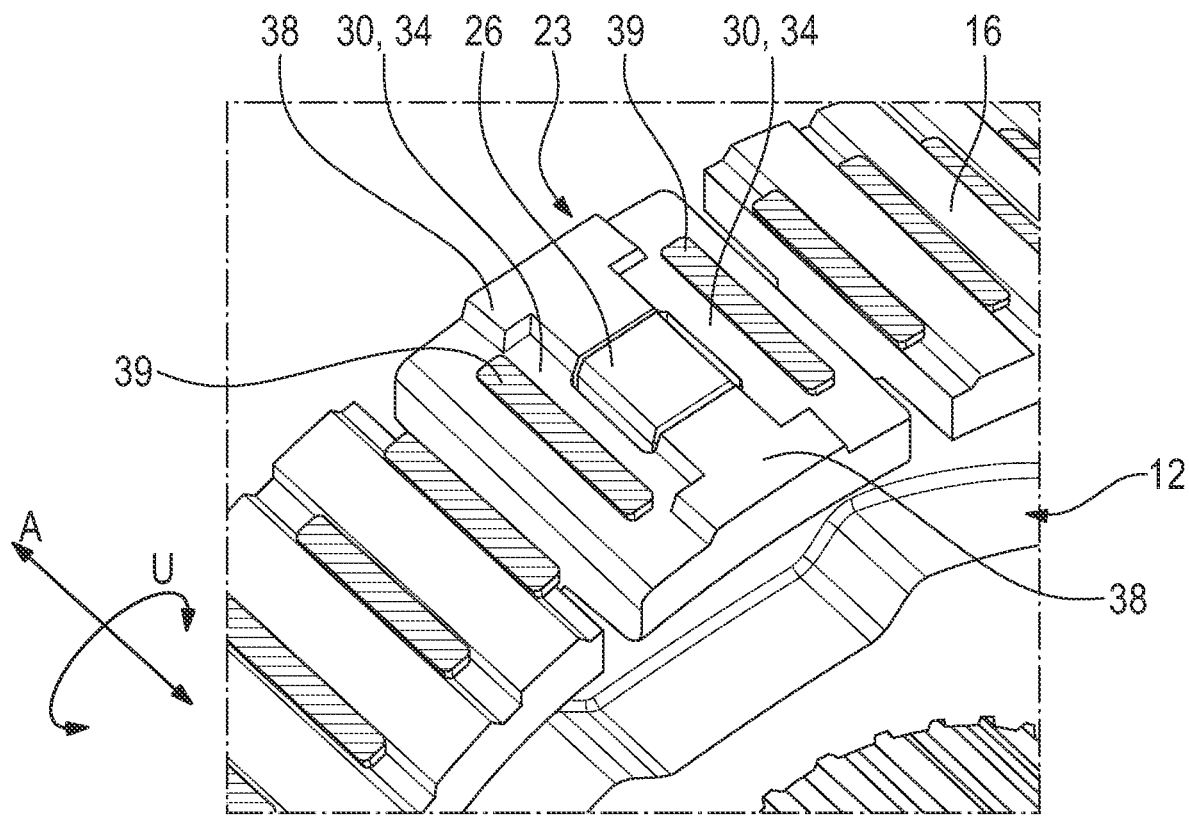
FIGS. 3 and 4 show schematic perspective views of the locking structures on the thrust piece and on the sliding sleeve.

The friction surfaces 42 are part of a conical surface which is adapted in shape to a conical surface on the respective clutch body 14, on which a mating friction surface 44 is formed (see, for example, FIGS. 1 and 2).

The retainer 24 in which the thrust piece 23 is received in the hub body 12 is configured such that the respective thrust piece 23 has sufficient clearance in the axial direction A that it can be displaced to the clutch bodies 14 so far in both directions until the friction surface 42 moves into frictional contact with the mating friction surface 44.

In the circumferential direction U, the clearance for movement of the thrust piece 23 in the retainer 24 between two side surfaces 46, which delimit the retainer 24 in the circumferential direction U, is larger and selected such that the thrust piece 23 can move from a central neutral position in either direction by an angular distance of $\alpha/2$ between two sliding sleeve teeth 36. This distance is dimensioned such that the tooth extensions 39 can engage in and completely leave the recesses 34 again (see, for example, FIGS. 6, 8 and 10).

In this way, the thrust pieces 23 can move from a central release position, in which none of the tooth extensions 39 engages in a recess 34, to two opposite locking positions, in which a respective one of the tooth extensions 39 is located in one of the recesses 34.

The toothings 18, 22 of the sliding sleeve 20 and the clutch body 14 include dimensions that are matched to each other so that the sliding sleeve teeth 36 can engage between the clutch body teeth 40.

Both the sliding sleeve teeth 36 and the clutch body teeth 40 are formed completely without engagement slopes.

Referring to FIGS. 5 to 10, the operation of the claw-type gearshift 10 will now be described.

Figure 5:
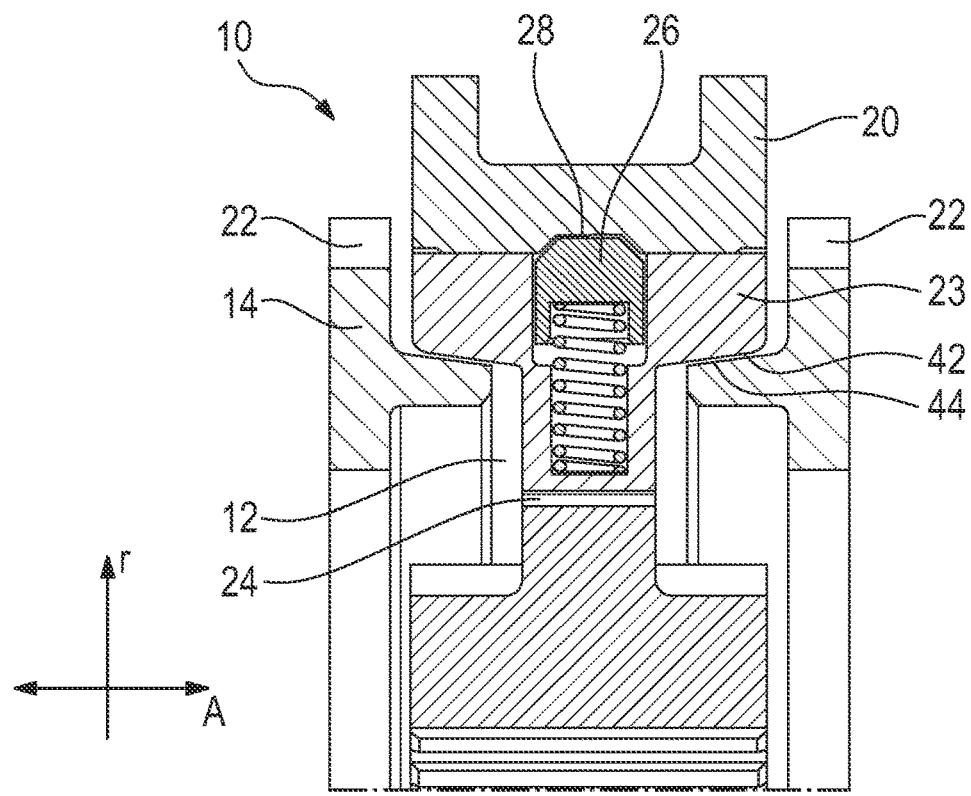
FIGS. 5 and 6 show schematic views of the claw-type gearshift from FIG. 1 in a neutral position, the thrust piece being in its release position.
Figure 6:
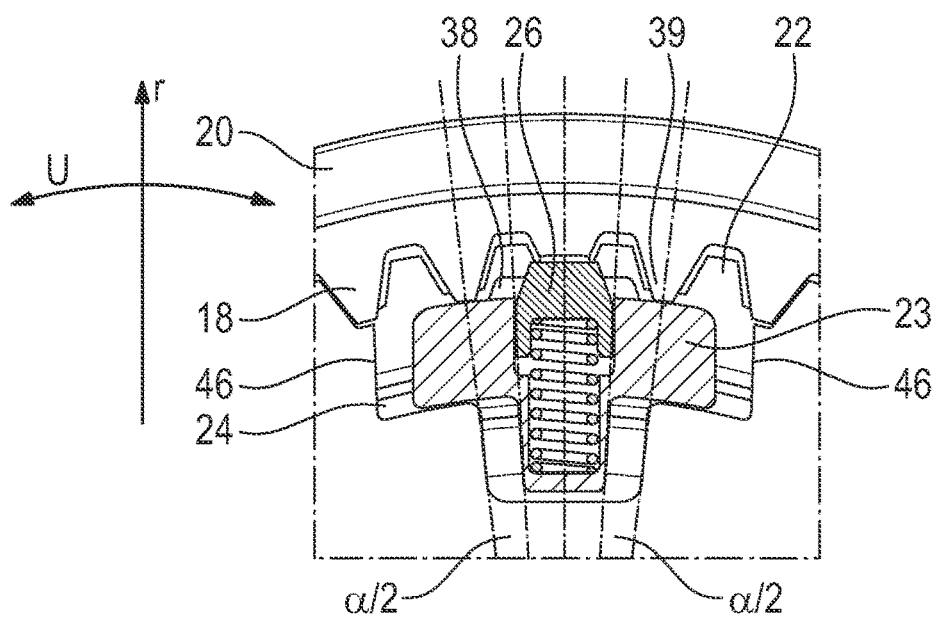

FIGS. 5 and 6 show the claw-type gearshift 10 in a neutral position.

The sliding sleeve 20 inclusive of the thrust pieces 23 and the clutch body 14 are axially spaced apart from each other and do not touch. The sliding sleeve 20 is positioned centrally between the two clutch bodies 14. The sliding sleeve teeth 36 are located in the gaps of the toothing 22 in the circumferential direction U. The tooth extensions 39 are located outside the recesses 34.

For shifting a gear, the speeds of the hub body 12 and the clutch body 14, which is to be coupled to the sliding sleeve 20, are first largely equalized by a device 48 for speed adaption (shown schematically in FIG. 2). The device 48 may, for example, be coupled to an electric motor of the vehicle and does not comprise the thrust pieces 23.

Only when this substantial speed adaption has been effected is an axial shifting force F applied, to the right in the Figures. The sliding sleeve 20 is displaced a short distance in the axial direction A, deflecting the locking blocks 26 in the process, which in turn entrain the thrust pieces 23 in the axial direction A until the friction surface 42 on the thrust piece 23 moves into frictional contact with the mating friction surface 44 on the clutch body 14 of the speed change gear to be shifted.

Since the hub body 12 and the clutch body 14 rotate at different speeds, the thrust pieces 23 are entrained in the circumferential direction U by the frictional forces between the friction surface 42 and the mating friction surface 44. In the process, the thrust pieces 23 flip from the central release position into one of the two locking positions. The rotation of the thrust pieces 23 is limited by the side surfaces 46 of the retainer 24 in the hub body 12.

The relative movement of the thrust pieces 23 in relation to the internal toothing 18 of the sliding sleeve 20 causes the tooth extension 39 of one of the sliding sleeve teeth 36 to move into the recess 34 on both sides of the sliding sleeve tooth 36 which includes the latching groove 28.

The sliding sleeve 20 is therefore prevented from further axial movement by the webs 38 axially bounding the recess 34.

The claw-type gearshift 10 is now in its locked position, in which the sliding sleeve 20 cannot move further toward the clutch body 14 in the axial direction A.

It is not intended that the sliding sleeve 20 can actively rotate the thrust pieces 23 back to their release position. The sides of the webs 38 facing the recess 34 are oriented such that the sliding sleeve teeth 36 cannot generate a sufficient force component in the circumferential direction U to result in a rotation of the thrust piece 23. When the thrust pieces 23 are in one of the locking positions, the sliding sleeve 20 is prevented from moving axially further to the associated clutch body 14, irrespective of the axial shifting force F applied.

The thrust pieces 23 here do not perform the task of speed adaption between the hub body 12 and the clutch body 14, which is effected practically exclusively by the device 48.

The device 48 further acts to adapt the speeds of the hub body 12 and the clutch body 14. In this process, after a short period of time, a rotational speed crossing will occur, that is, a change in direction of the relative rotational speed of the hub body 12 and the clutch body 14.

Figure 9:
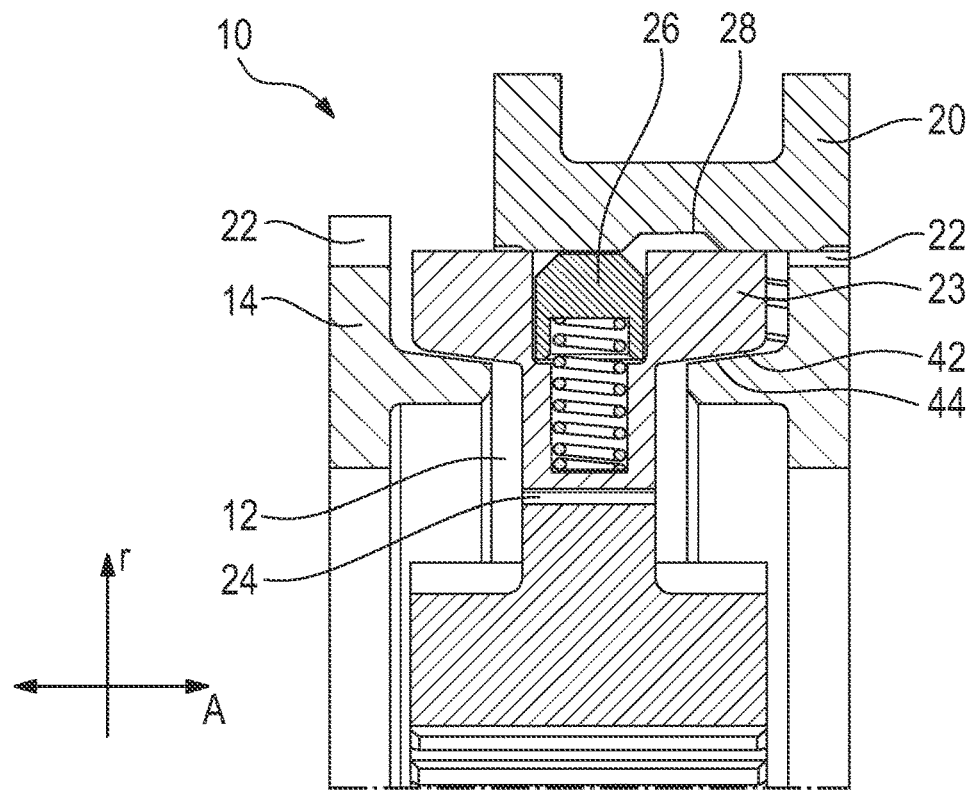
FIGS. 9 and 10 show schematic views of the claw-type gearshift from FIG. 1 in a docking position, in which the thrust piece is in the release position and the sliding sleeve is in engagement with the clutch body.
Figure 10:
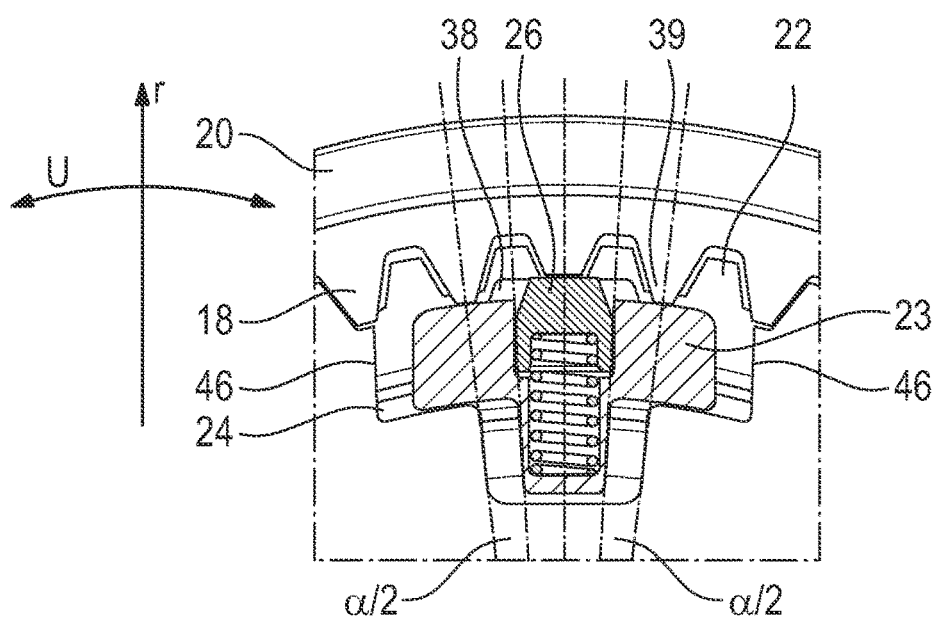

This change in the direction of rotation causes the thrust pieces 23 to flip back to the release position in the circumferential direction U, resulting in the docking position shown in FIGS. 9 and 10. The tooth extensions 39 are located next to the recesses 34 in the circumferential direction U.

The sliding sleeve 20 can now be moved further in the axial direction A, with its internal toothing 18 engaging with the external toothing 22 of the clutch body 14.

The rotational speed crossing is also always associated with the build-up of a new, small difference in speed between the hub body 12 and the clutch body 14. This ensures that the sliding sleeve 20 and the clutch body 14 automatically move to a position in which the sliding sleeve teeth 36 meet the gaps in the external toothing 22 of the clutch body 14, even if there should be a tooth-on-tooth position at the first contact.

The thrust pieces 23 are not involved in this process.

While having a compact axial type of construction, the claw-type gearshift 10 allows a low-noise and low-wear shifting, since the movement of the sliding sleeve 20 is blocked as a result of the circumferential displacement of the thrust pieces 23 until a rotational speed crossing has taken place. However, the thrust pieces 23 are not made use of for speed adaption here.

The invention claimed is:

1. A claw-type gearshift, comprising:
a sliding sleeve which is adapted to be axially displaced on a hub body and includes an internal toothing having a multitude of sliding sleeve teeth, and a clutch body of a speed change gear, which includes an external toothing which has a multitude of clutch body teeth and is adapted to engage with the internal toothing of the sliding sleeve,
wherein arranged at the hub body is at least one thrust piece which is coupled to the sliding sleeve and includes a friction surface that cooperates with a mating friction surface on the clutch body,
wherein the at least one thrust piece is displaceable in relation to the hub body in a circumferential direction by a certain degree between a release position and two locking positions, the two locking positions being located on either side of the release position in the circumferential direction, and
wherein the at least one thrust piece includes a first locking structure which cooperates with a second locking structure on the internal toothing of the sliding sleeve, and the locking structures are configured such that in each of the two locking positions, the locking structures rest against each other such that a further axial movement of the sliding sleeve is blocked.

2. The claw-type gearshift according to claim 1, wherein the first locking structure on the at least one thrust piece includes two axially limited and oppositely oriented recesses that are open in the circumferential direction, and the second locking structure on the internal toothing of the sliding sleeve is formed by radial tooth extensions, wherein in each of the two locking positions a respective tooth extension engages in one of the recesses.

3. The claw-type gearshift according to claim 2, wherein the tooth extensions are provided to limit a shifting travel toward the clutch body.

4. The claw-type gearshift according to claim 1, wherein the at least one thrust piece is received in a retainer in the hub body, the retainer being made so large that the retainer allows a displacement of the at least one thrust piece in the circumferential direction into both locking positions.

5. The claw-type gearshift according to claim 1, wherein the friction surface is formed on a lower surface of the at least one thrust piece and the mating friction surface is formed on a conical surface of the clutch body.

6. The claw-type gearshift according to claim 1, wherein the claw-type gearshift is for a manual transmission.

7. A method of shifting a claw-type gearshift having a sliding sleeve which is adapted to be axially displaced on a hub body and a clutch body of a speed change gear, which is adapted to move into engagement with the sliding sleeve, wherein arranged on the hub body is at least one thrust piece which is adapted to be deflected axially and in a circumferential direction and which includes a friction surface adapted to come into contact with a mating friction surface on the clutch body, the method comprising:
reducing a difference in speed between the clutch body and the hub body;
applying a shifting force and deflecting the sliding sleeve in the axial direction toward the speed change gear to be shifted, causing the at least one thrust piece to be deflected axially and the friction surface of the at least one thrust piece to come into contact with the mating friction surface of the clutch body;
displacing the at least one thrust piece in the circumferential direction to one of the two locking positions by the frictional connection with the clutch body, wherein a further axial movement of the sliding sleeve is prevented by engagement of a first locking structure on the at least one thrust piece with a second locking structure on the sliding sleeve;
returning the at least one thrust piece to the release position in the circumferential direction by the frictional connection when a change in direction of the relative rotational speed of the clutch body and the hub body takes place; and
engaging the internal toothing of the sliding sleeve with the external toothing of the clutch body.

8. The method according to claim 7, wherein the at least one thrust piece blocks an axial further movement of the sliding sleeve irrespective of the acting shift force, and a relative rotation between the hub body and the clutch body, which allows the internal toothing of the sliding sleeve to engage in the external toothing of the clutch body, is achieved by a speed difference between the sliding sleeve and the clutch body that builds up after the rotational speed crossing.

9. The method according to claim 7, wherein a locking block of the at least one thrust piece is displaced radially inwards when, in the release position, the sliding sleeve is engaged in the clutch body.

10. The method according to claim 7, wherein the adaption of the speeds of the hub body and the clutch body is effected by a device separate from the at least one thrust piece.

11. The method according to claim 7, wherein the internal toothing of the sliding sleeve has a multitude of sliding sleeve teeth, and the external toothing of the clutch body has a multitude of clutch body teeth,
wherein arranged at the hub body is at least one thrust piece which is coupled to the sliding sleeve and includes a friction surface that cooperates with a mating friction surface on the clutch body,
wherein the at least one thrust piece is displaceable in relation to the hub body in the circumferential direction by a certain degree between a release position and two locking positions, the locking positions being located on either side of the release position in the circumferential direction, and wherein the at least one thrust piece includes a first locking structure which cooperates with a second locking structure on the internal toothing of the sliding sleeve, and the locking structures are configured such that in each of the locking positions, the locking structures rest against each other such that a further axial movement of the sliding sleeve is blocked.

* * * * *